UNITED STATES PATENT OFFICE.

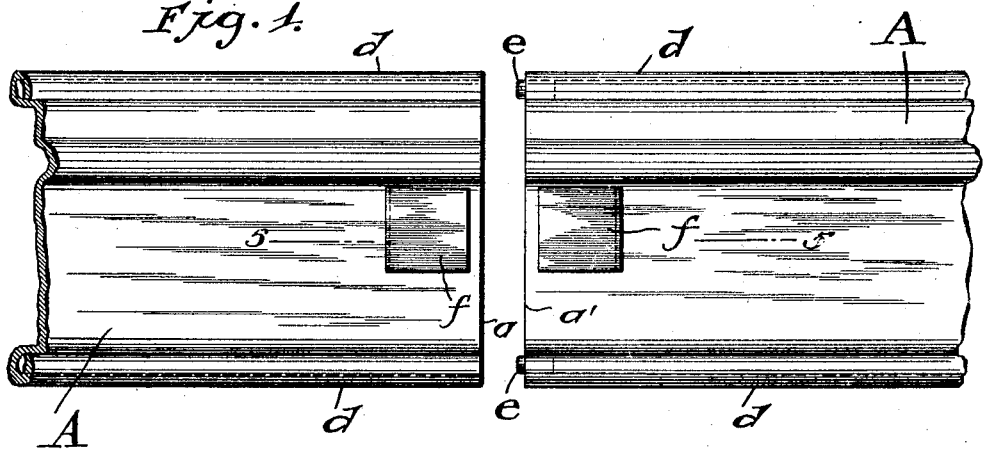
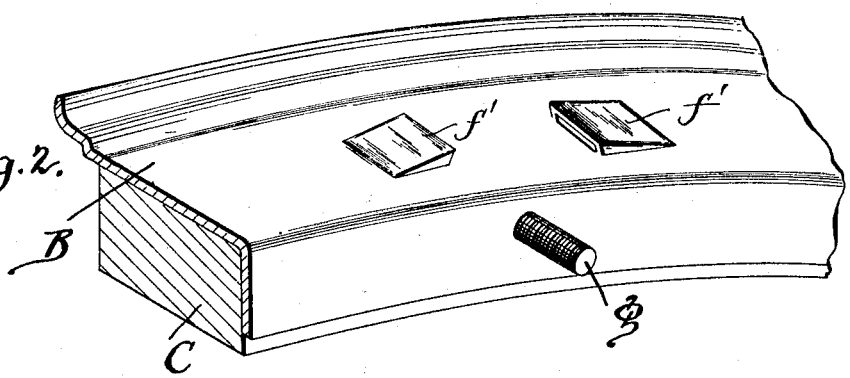
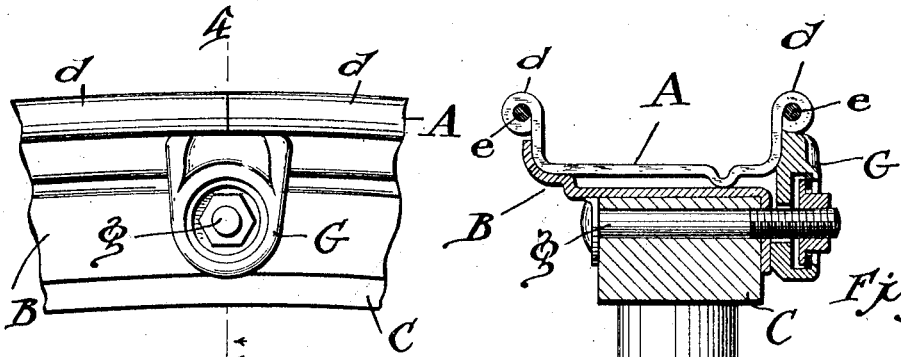

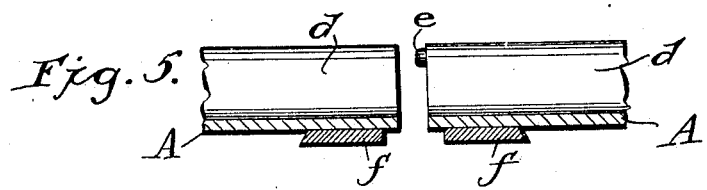
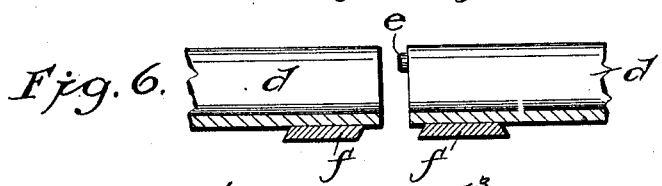
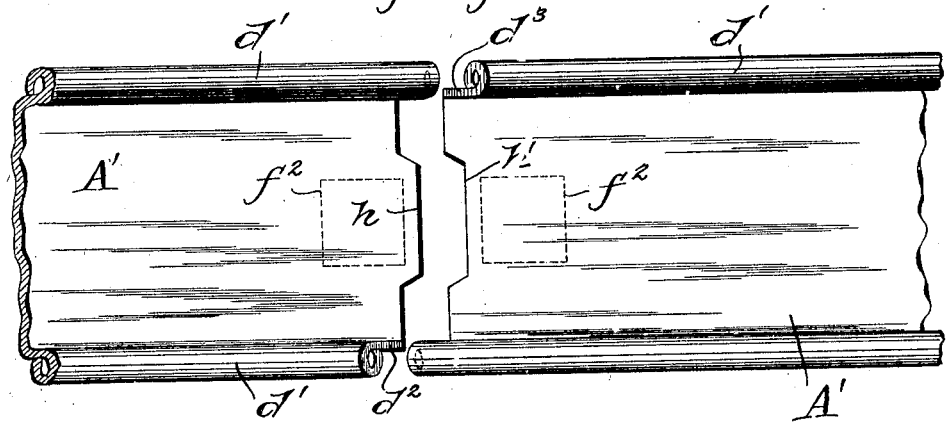
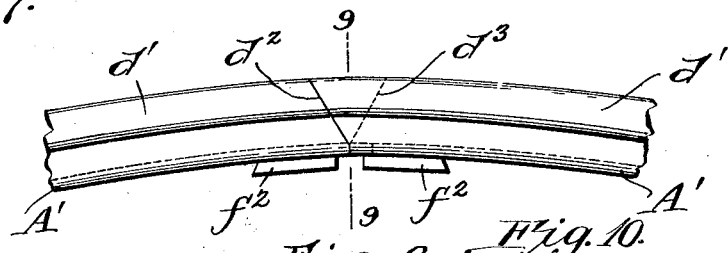
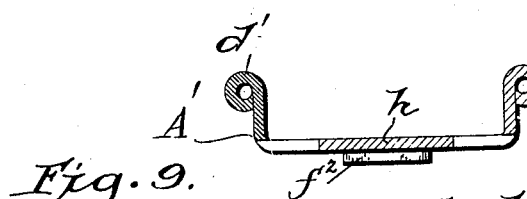

CHARLES C. HANCH, OF SOUTH BEND, INDIANA, AND ROBERT A. BRANNIGAN, OF NEW YORK, N. Y., ASSIGNORS TO THE STUDEBAKER CORPORATION, A CORPORATION OF NEW JERSEY.

DEMOUNTABLE RIM FOR VEHICLES.

1,334,153.      Specification of Letters Patent.     Patented Mar. 16, 1920.

Application filed April 24, 1917. Serial No. 164,098.

*To all whom it may concern:*

Be it known that we, CHARLES C. HANCH, a citizen of the United States of America, and resident of South Bend, in the county of St. Joseph and State of Indiana, and ROBERT A. BRANNIGAN, a citizen of the United States of America, and resident of New York city, in the county of New York and State of New York, have invented certain new and useful Improvements in Demountable Rims for Vehicles, of which the following is a specification.

This invention is a demountable rim for vehicles, and relates, more particularly, to that type of rim to which a pneumatic tire is adapted to be applied, while the rim is removed from the felly of a wheel. In this general type of rim, the rim is split or parted transversely to allow the same to be readily brought into coöperative relation with a tire. The tire is applied to the rim and the inner tube inflated at any convenient time or place. The rim, with the inflated tire thereon, is adapted to be thereafter positioned, as a unit, upon the felly of a wheel and secured in place by suitable attaching means.

The object of the invention is to provide improved and simplified means for maintaining the free ends of the demountable rim in alinement and in abutting relation, in such manner that a sudden jar or pressure will not serve to destroy the alinement of the free ends of the rim either when the rim is in place upon the wheel or when removed therefrom.

In the accompanying drawings, we have illustrated different practical forms of the invention, but the constructions therein shown are to be understood as illustrative, only, and not as defining the limits of the invention.

Figure 1 is an inside view of the adjacent free ends of a demountable rim embodying the present invention.

Fig. 2 is a perspective view of that portion of the felly and felly-band of the wheel with which the portions of the demountable rim shown in Fig. 1 are adapted to coöperate.

Fig. 3 is a side elevation of the parts shown in Figs. 1 and 2 assembled.

Figs. 4 and 5 are sections on line 4—4 of Fig. 3, and line 5—5 of Fig. 1, respectively.

Fig. 6 is a section corresponding to Fig. 5, but illustrating a slightly modified form of construction.

Figs. 7 and 8 are a plan and elevation, respectively, of another modified form.

Fig. 9 is a section on line 9—9 of Fig. 8, and

Fig. 10 is a section corresponding to that of Fig. 5, but illustrating a modified shaping of the flanges of the rim.

Referring to Figs. 1 to 5 of the drawings, A indicates a demountable rim made, as usual, in substantially the form of an annulus or ring, and transversely parted at one point in its circumference to form a split annulus having adjacent free ends $a\ a'$. Demountable rim A is adapted to be encircled by a tire generally embodying a shoe and an inner tube, and the assembled parts are adapted to be slipped thereafter over a felly-band B which is secured to the felly C of a wheel. Different forms of demountable rims and felly-bands may be employed, but the general form shown is one of those commonly used and is advanced for illustrative purposes, only.

The form of demountable rim shown in these figures is that wherein the lateral edges of the rim are rolled so as to provide the rim with smooth, rolled flanges $d$ along its edges, adapted to engage with a shoe in such manner as not to cut the same. The present invention may be readily and economically adapted to rims of this character by inserting a pin $e$ into one free end of each of the flanges $d$ and securing said pins in such position that they will project for a short distance beyond the free ends of their respective flanges. Pins $e$ may be secured in fixed position in any suitable manner and are preferably secured to the same free end $a'$ of the demountable rim and project for a short distance beyond said end, as clearly shown in Fig. 1. Moreover, they are of such size that, when the free ends of the rim are brought into alinement and abutting relation, the projecting portions of said pins are adapted to enter the interior of the juxtaposed opposite ends of flanges $d$.

It will be manifest that, with a construction organized as specified, a tire may be readily positioned upon the rim in the usual way, during which operation the free ends of the rim may be caused to overlap by moving one radially of the rim with respect to the other, or by moving one free end transversely of the other. However, after the tire is in place upon the rim, the ends of said rim may be sprung into alined, abutting relation, with the projecting portions of the pins *e* seated in the contiguous ends of flanges *d* at the opposite free end of the rim. After the tire has been inflated, the pressure on the tire will force the free ends *a a'* of rim A tightly together, thereby maintaining the projecting portions of the pins in the opposite ends of the flanges, and, by virtue of such engagement, relative radial or lateral movement between the free ends of the rim is absolutely precluded until such time as the tire is deflated.

The demountable rim, with the inflated tire in position thereon, may thus be handled in a most careless and indifferent manner, without fear of destroying the alinement of the free ends of the rim, in the event of which a blow-out of the tire would result.

Considerable circumferential strain is, however, placed upon the rim during its act of passing over the ground when encircling a wheel, and, to preclude this circumferential force from overcoming the force of the pressure of the tire in maintaining the free ends of the rim in abutting relation, means is provided to mechanically lock said free ends against separation. This means is embodied in the preferred form illustrated, in a pair of lugs *f* mounted near the opposite free ends of the rim and on the inner periphery of said rim, and two similar coöperating lugs *f'* are formed on the felly-band B. Lugs *f* are of such distance apart, relative to the circumferential distance between the lugs *f'*, that, when rim A is brought into position to encircle the felly-band, with the adjacent ends *a a'* of said rim in abutting relation, lugs *f* will lie between lugs *f'*, with the adjacent face of each of the lugs *f* and *f'* in engagement with its adjacent lug. Moreover, the contiguous edges of the coöperating lugs *f f'* are undercut so that, aside from the function of locking each free end of the rim against circumferential movement relative to the other free end thereof, the coöperative effect between said lugs is, also, to preclude outward, radial movement of said free ends. The free ends are thus maintained in abutting relation, even though the pressure on the tire is diminished or entirely removed. Lugs *f f'*, moreover, serve as driving lugs to preclude bodily, circumferential movement of rim A relative to felly-band B. It will thus be manifest that, while pins *e* preclude relative radial and lateral or transverse movement between the free ends of demountable rim A, lugs *f f'* maintain said free ends in abutting relation and preclude their separation. Thus, the present invention does not utilize the driving lugs *f f'* for the purpose of maintaining the alinement of the free ends of the demountable rim, as this function is accomplished entirely by pins *e*. The lugs *f* may thus be spaced back from the free ends of the rim, although, in practice, they are preferably positioned quite close to the ends, as shown in Fig. 1. This is for the reason that, when a shoe is in place upon the rim, the tension of the shoe and rim is generally considerable, even when the tire is inflated, so that it is frequently difficult to force apart the ends of the rim to disengage the pins *e* for the purpose of allowing one end of the rim to slide by the other end thereof. When the lugs *f* are positioned closely adjacent the ends of the rim, a space is left between the adjacent edges of the lugs, into which a screw-driver or other implement may be inserted, and, by a twist of the wrist, a leverage may be applied to force the lugs, and consequently the free ends of the rim, apart. This is of considerable practical importance, as it greatly facilitates the removal of the shoe from the rim.

The lugs *f* may be of any desired shape, and their adjacent edges may be either cut down straight, as shown in Figs. 1 and 5, or they may be complementarily beveled, as shown in Fig. 6. The construction of Fig. 6 works out very well in practice, as the undercut bevel at the pin end of the rim facilitates the prying of the ends apart, through the use of a screw-driver or similar implement.

The demountable rim may be maintained upon the felly-band in any desired manner, such, *e. g.*, as by bolts *g* which pass through the felly of the wheel, and to the threaded ends of which are applied clamping members G, after the manner shown in Figs. 3 and 4. It will, of course, be understood that any number of bolts and a corresponding number of clamping members may be employed, and these bolts may be spaced around the felly as the particular conditions may require.

The foregoing description deals with the preferred form of the present invention as applied to demountable rims provided at their edges with rolled beads or flanges, as shown. However, it will be understood that the invention is not restricted to use with rims of such construction. If desired, the invention may be embodied in rims having solid flanges, in which instance the free ends of said flanges at one side of the cut in the rim would be provided with projections corresponding to the projecting portions of pins *e*, and the other ends of said flanges would be recessed or provided with apertures, into which said projections would be adapted to seat. In either case, the projecting portions of the pins extend only a short distance beyond the free end of the rim to which they are secured, so that it is not necessary to force the free ends of the rim a great distance apart in order to seat the projections within their seats, in assembling the construction, or to remove the pins from their seats for the purpose of removing a tire.

In Figs. 1 to 6, inclusive, the maintaining of the free ends of the rim in alinement, by means of pins which preclude relative transverse or radial movement of said free ends, is illustrated and has been described. In practice, this form of the invention is highly satisfactory, comparatively cheap to manufacture, and durable in use, but this invention is not limited to the use of pins in the carrying out of the specified functions.

In Figs. 7 to 9, inclusive, is illustrated a construction which will effectually preclude relative lateral or radial movement between the free ends of a demountable rim, independently of the employment of pins. In this modified form of construction, relative lateral movement is precluded by providing the free ends of rim A' with complementary interlocking portions, one end of said rim having a tongue or projection $h$, adapted, when said ends are in abutting relation, to interfit with a cut-away portion or recess $h'$ in the other end of the rim.

While the construction thus far described will effectually preclude relative lateral movement, it will, of course, not interfere with radial movement, but this is obviated by so forming the flanges $d'$, with which the opposite lateral edges of the rim are provided, that said flanges will break joints with themselves, or with one another. In carrying out this thought, the opposite ends of the flange $d'$ at one side of the rim may be provided with complementary interlocking or interfitting portions $h^2$, $h^3$, as shown in Fig. 10, or, as shown in Fig. 8, the opposite ends of the two flanges may abut one another in different planes or curves. That is to say, the flange $d'$ at one edge of the rim may be formed with its adjacent ends complementarily cut, as at $d^2$, at an angle extending to one side of the radial plane of parting of the rim, while the free ends of the other flange may be similarly cut, as at $d^3$, at an angle extending to the opposite side of said plane of parting, as clearly shown in Fig. 8. It will be manifest that this construction will result in the locking of the free ends of the rim against relative radial movement as long as said free ends are maintained in abutting relation.

The construction of Figs. 7, 8 and 9 embodies driving lugs $f^2$ $f^2$, as in the previously described form of construction, and coöperates with the felly-band B in substantially the same way, being locked in place by any suitable means, such as clamping members G.

It will be noted that, in both forms of the invention illustrated and described, there is a basic, underlying principle, to wit, that the meeting rim ends present an irregular contour, when considered in a radial direction or in a lateral direction, and that said rim ends are precluded from relative lateral or radial movement by their own shaping, and entirely independently of the driving lugs on the inner side of said rim or on the felly-band. It is of course true that, since the driving lugs $f$ and $f'$ are under-cut, they have a tendency to preclude relative radial movement of the free ends of the rim, but this is only an incidental function, as the free ends of the rim are so shaped and constituted, that, of themselves, they will preclude relative radial, as well as relative lateral movement between them. The ends of the rim are thus not dependent for their maintenance in perfect alinement upon the driving lugs, though these lugs do, incidently assist in this respect.

In the constructions of this invention, the double irregularity described renders it impossible to move the rim ends relative to each other, either laterally or radially, without causing a simultaneous separation, and this separation is prevented by the pressure of the tire when the rim is off the wheel, or by the pressure of the tire and the interlocking of the traction or driving lugs when the rim is on the wheel. The rim ends are locked against any stresses they meet, and, yet, are readily separable when the tire is deflated. It will be noted that this invention needs no extra parts, in the way of locks or attachments, across the transverse cut in the rim to render the device stable. Moreover, the construction may be economically manufactured, forming the pins $e$ either separately and applying them after the rim has been otherwise completed, or forming said pins integral with the rim.

Having thus fully described the invention, what we claim as new, and desire to secure by Letters Patent, is:

1. A transversely split demountable rim provided at its edges with flanges, one end of each flange being provided with a projection adapted to seat in an orifice in the opposite end of said flange when the free ends of the rim are brought into abutting relation, for the purpose of precluding relative radial or lateral movement between the free ends of the rim as long as the said free ends are in abutting relation.

2. A transversely split demountable rim provided at its edges with flanges, one end of each flange being provided with a projection adapted to seat in an orifice in the opposite end of said flange when the free ends of the rim are brought into abutting relation, for the purpose of precluding relative radial or lateral movement between the free ends of the rim as long as the said free ends are in abutting relation, and driving lugs fixed on the inner periphery of the rim and adapted to engage with the driving lugs of a felly-band for the purpose of maintaining the free ends of the rim in abutting relation when said rim is in place upon the felly-band of a wheel.

3. A transversely split demountable rim provided at its edges with flanges, one end of each flange being provided with a projection adapted to seat in an orifice in the opposite end of said flange when the free ends of the rim are brought into abutting relation, for the purpose of precluding relative radial or lateral movement between the free ends of the rim as long as the said free ends are in abutting relation, and driving lugs fixed on the inner periphery of the rim and adapted to engage with the driving lugs of a felly-band for the purpose of maintaining the free ends of the rim in abutting relation when said rim is in place upon the felly-band of a wheel, said lugs of the rim being positioned at a distance from the free ends of said rim.

4. A transversely split demountable rim provided at each of its lateral edges with a rolled flange, and a pin positioned within one end of each flange so as to protrude beyond the end of the flange and extend into the passage at the other end of the flange when the ends of the rim are in abutting relation, for the purpose of maintaining the free ends of the rim in alinement.

5. A transversely split demountable rim provided at each of its lateral edges with a rolled flange, a pin positioned within one end of each flange so as to protrude beyond the end of the flange and extend into the passage at the other end of the flange when the ends of the rim are in abutting relation, for the purpose of maintaining the free ends of the rim in alinement, and driving lugs positioned on the inner periphery of the rim and adapted to coöperate with projections on a felly-band for the purpose of maintaining the ends of the rim in abutting relation when said rim is in position upon the felly-band.

Signed by me at South Bend, Indiana, this 20th day of April, 1917.

CHARLES C. HANCH.

Witnesses:
H. M. MARTINDALE,
J. M. PETERSON.

Signed by me at New York city, New York, this 18 day of April, 1917.

ROBERT A. BRANNIGAN.

Witnesses:
E. V. CLARKE,
L. S. PADDOCK.